(12) United States Patent
Hori et al.

(10) Patent No.: US 8,727,054 B2
(45) Date of Patent: May 20, 2014

(54) MOVABLE GRILLE SHUTTER FOR VEHICLE

(75) Inventors: Kenji Hori, Anjo (JP); Hiroshi Watanabe, Obu (JP); Yoshimasa Asano, Kariya (JP); Masumi Nishikawa, Toyoake (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 356 days.

(21) Appl. No.: 13/064,251

(22) Filed: Mar. 14, 2011

(65) Prior Publication Data

US 2011/0226541 A1 Sep. 22, 2011

(30) Foreign Application Priority Data

Mar. 19, 2010 (JP) ................................ 2010-064588

(51) Int. Cl.
*B60K 11/08* (2006.01)

(52) U.S. Cl.
USPC .............. 180/68.1; 180/68.4; 165/41; 165/98

(58) Field of Classification Search
USPC .............. 180/68.1, 68.4, 68.6; 165/41, 65, 98
See application file for complete search history.

(56) References Cited

U.S. PATENT DOCUMENTS

| 1,660,145 | A | * | 2/1928 | Winans ........................... 165/41 |
| 1,660,146 | A | * | 2/1928 | Winans ........................ 165/11.1 |
| 1,870,378 | A | * | 8/1932 | Noblitt et al. .................... 165/41 |
| 1,884,195 | A | * | 10/1932 | Petersen .......................... 165/98 |
| 1,910,905 | A | * | 5/1933 | Petersen .......................... 165/98 |
| 1,918,846 | A | * | 7/1933 | Johannsen ........................ 165/98 |
| 1,978,892 | A | * | 10/1934 | Bolkcom ....................... 165/163 |
| 2,186,299 | A | * | 1/1940 | Klas .............................. 180/68.6 |
| 2,189,888 | A | * | 2/1940 | Endsley ....................... 105/62.2 |
| 2,200,733 | A | * | 5/1940 | Agerell et al. .................. 165/98 |
| 2,276,279 | A | * | 3/1942 | Asklund ....................... 180/68.1 |
| 4,753,288 | A | * | 6/1988 | Harvey ............................ 165/98 |

FOREIGN PATENT DOCUMENTS

| DE | 10 2008 013 420 | | 9/2009 | |
| GB | 2131150 | A * | 6/1984 | .............. F28F 13/06 |
| JP | 58-139519 | | 9/1983 | |
| JP | 62-17313 | | 1/1987 | |
| JP | 64-018744 | | 1/1989 | |

OTHER PUBLICATIONS

Japanese Office Action for JP 2010-064588 dated Dec. 17, 2013.

* cited by examiner

*Primary Examiner* — J. Allen Shriver, II
*Assistant Examiner* — Ridget Avery
(74) *Attorney, Agent, or Firm* — Finnegan, Henderson, Farabow, Garrett & Dunner, LLP

(57) ABSTRACT

A movable grille shutter for a vehicle includes a fin adapted to be provided at a grille opening portion and being operated so as to freely open or close the grille opening portion through which ambient air is taken in, a drive source for driving the fin, a driving force transmitting mechanism for transmitting a driving force from the drive source to the fin and a flexible member being linked to the driving force transmitting mechanism and being deformed for operating the fin to open the grille opening portion in a case where a load that is equal to or more than a predetermined value is acted thereon.

8 Claims, 4 Drawing Sheets

← Front　　　　　　　　　　　　　Rear →

Closing direction

MOVABLE GRILLE SHUTTER FOR VEHICLE

CROSS REFERENCE TO RELATED APPLICATIONS

This application is based on and claims priority under 35 U.S.C. §119 to Japanese Patent Application 2010-064588, filed on Mar. 19, 2010, the entire content of which is incorporated herein by reference.

TECHNICAL FIELD

This disclosure relates to a movable grille shutter for a vehicle, the grille shutter including a drive source and fins that is provided at a grille opening portion of the vehicle and is driven by the drive source.

BACKGROUND DISCUSSION

According to a known movable grille shutter for a vehicle, in order to prevent poor combustion caused by an overcooled radiator within an engine room, a grille opening portion through which ambient air is taken in is operated to be opened or closed. For example, such grille shutter includes a plurality of fins provided at a base frame so as to be freely rotatable in such a way that the fins are connected to each other by an interlocking arm, and the interlocking arm is connected to a link mechanism that is configured by a driving arm, formed so as to include a long through hole, and a pin arranged so as to inserted into the long through hole. In this configuration, the driving arm is rotated by a drive source such as a motor in order to operate the fins so as to open or close the grille opening portion (for example a movable grille shutter disclosed in JP58-139519U).

Further, the driving force from the drive source may be decelerated by a combination of worm and spur gears and then be selectively transmitted to two movable members through an one-way clutch, in order to actuate one movable member, while stopping actuation of the other of the movable members (for example a movable grille shutter disclosed in JP64-18744A).

According to the movable grille shutter disclosed in JP58-139519U, in a case where the grille shutter is provided at a lower portion of a bumper, when the vehicle is driven through a puddle on a road surface, because an overload caused by water pressure acts on the fins and the driving force transmitting members, the overload acting on the fins is transmitted to the fins and the members for transmitting the driving force, accordingly the fins and the driving force transmitting members may break due to pressure.

Further, according to the grille shutter disclosed in JP64-18744A, although the one-way clutch is used at the movable grille shutter, such clutch does not function to support the overload acting on the fins, accordingly the fins and the members for transmitting the driving force may break due to the overload acting on the fins.

A need thus exists to provide a movable grille shutter for vehicle, which is not susceptible to the drawback mentioned above.

SUMMARY

According to an aspect of this disclosure, a movable grille shutter for a vehicle includes a fin adapted to be provided at a grille opening portion and being operated so as to freely open or close the grille opening portion through which ambient air is taken in, a drive source for driving the fin, a driving force transmitting mechanism for transmitting a driving force from the drive source to the fin and a flexible member being linked to the driving force transmitting mechanism and being deformed for operating the fin to open the grille opening portion in a case where a load that is equal to or more than a predetermined value is acted thereon.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment of this disclosure will be explained.

Figure 1:
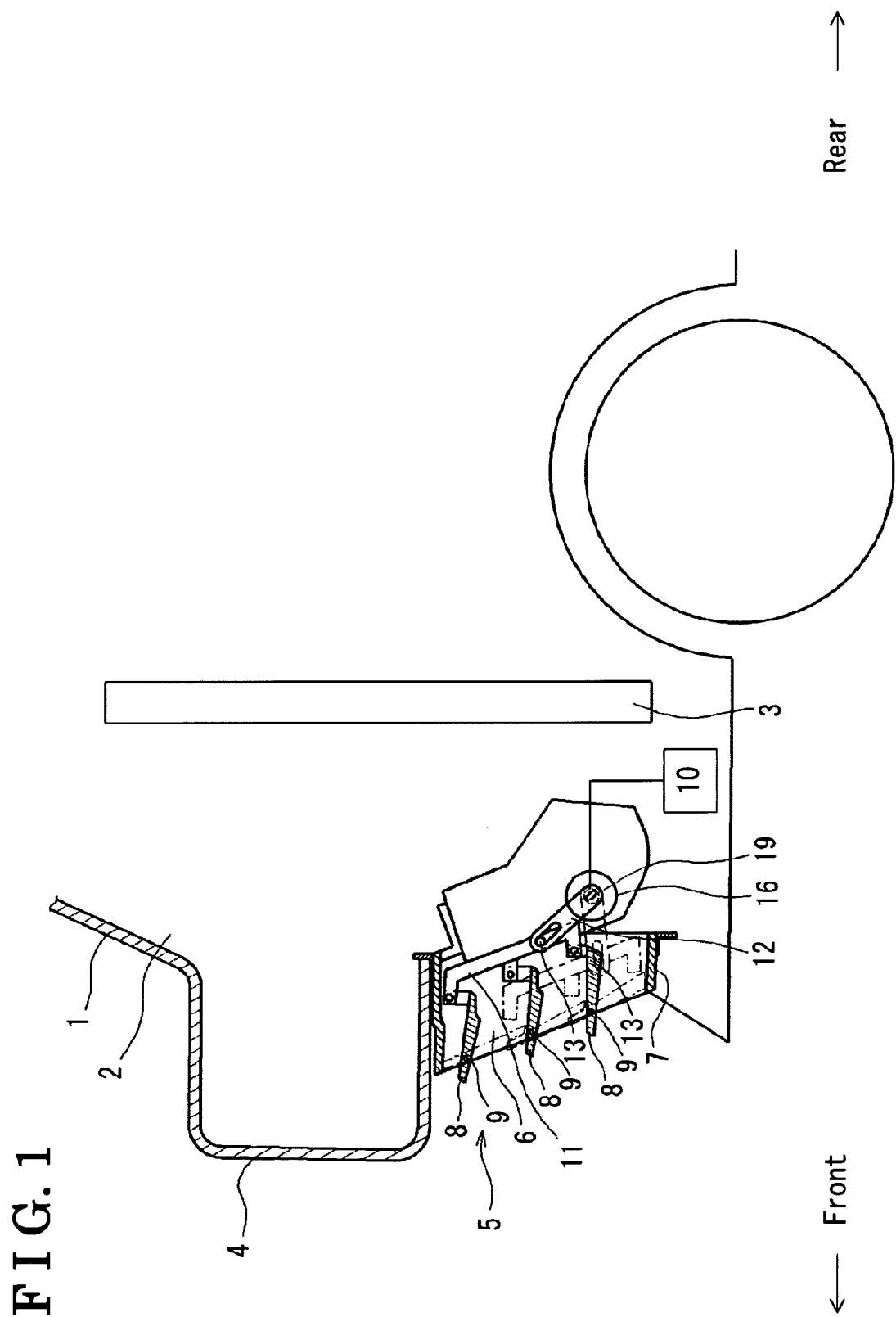
FIG. 1 is a side view of an engine room indicating an entire configuration of a grille shutter related to a first embodiment of this disclosure.

FIG. 1 is a side view of an engine room 2 in which an entire configuration of a grille shutter 5 related to the first embodiment is illustrated. In the engine room 2, a radiator 3 for cooling engine coolant water is arranged so as to be attached to a vehicle body 1. At a lower front of the radiator 3 in a vehicle front-rear direction, a grille opening portion 6 is formed. At the grille opening portion 6, a base frame 7 is provided, and a plurality of fins 8 are attached so as to be freely rotatable relative to a supporting shaft 9, respectively. The fins 8 are connected to each other by an interlocking arm 11 (e.g., a driving force transmitting mechanism) by means of pins 13 (e.g., a driving force transmitting mechanism), and the interlocking arm 11 is connected to a driving arm 12 (e.g., a driving force transmitting mechanism) by means of the pin 13, thereby forming a link mechanism. A driving force generated at a motor 10 (e.g., a drive source) is transmitted to an output shaft 19 (e.g., the driving force transmitting mechanism) via a driving speed reducing gear train (e.g., the driving force transmitting mechanism). A torsion spring 16 (e.g., a flexible member) is arranged between the output shaft 19 and the driving arm 12.

Figure 2:
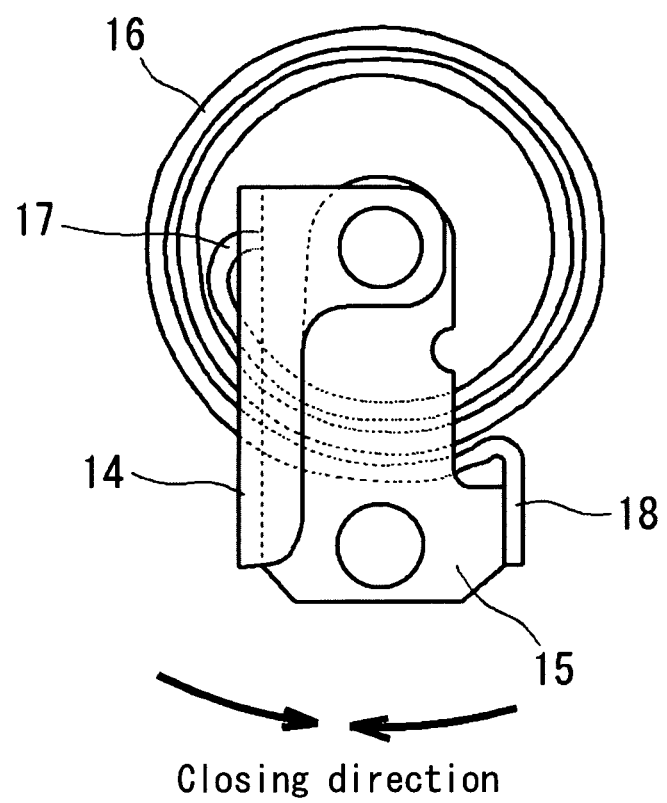
FIG. 2 is a side view of a torsion spring.

FIG. 2 is a side view of the torsion spring 16. The torsion spring 16 is formed so as to include a first hook portion 17 and a second hook portion 18. The torsion spring 16 is provided in such a way that the first hook portion 17 of the torsion spring 16 presses a first bracket 14, and the second hook portion 18 presses a second bracket 15, so that the first bracket 14 and the second bracket 15 are pressing each other in order to generate an initial load in a direction where the fins 8 are operated to close the grille opening portion 6. The first bracket 14 is connected to the output shaft 19 so as to be integrally rotated, and the second bracket 15 is connected to the driving arm 12 so as to be integrally rotated. The initial load generated by the torsion spring 16 is set to a level that is higher than a load caused by wind pressure or the like applied to the fins 8.

In a case where a normal level of the wind pressure acts on the fins 8, the torsion spring 16 is not deformed so as to operate the fins 8 to open the grille opening portion 6, and when the motor 10 generates a driving force, the torsion spring 16 transmits the driving force, while keeping a relative position between the driving arm 12 and the output shaft 19, in order to operate the fins 8 to open the grille opening portion 6. In a case where a vehicle is driven through a puddle on a road surface, because an overload caused by water pressure or the like acts on the fins 8, the overload acting on the fins 8 is transmitted to the torsion spring 16 via the interlocking arm 11, the driving arm 12 and the pins 13, accordingly the torsion spring 16 is deformed in a direction in which the fins 8 are operated so as to open the grille opening portion 6, thereby operating the fins 8 without actuating the motor 10.

According to the grille shutter 5 related to this disclosure, because the overload caused by the water pressure or the like applied to the fins 8 is absorbed by the torsion spring 16 that is deformed, the fins 8 are actuated so as to open the grille opening portion 6, where the overload caused by water pressure or the like is avoided. Accordingly, the fins 8, the link mechanism (11 through 13), the driving speed reducing gear train and the like are protected from the overload, thereby preventing them from being damaged. The initial load of the torsion spring 16 may be freely set to any level so that the fins 8 are not actuated so as to be opened by the wind pressure caused when the vehicle is driven at the normal speed. Further, the torsion spring 16 and the brackets 14 and 15 are put together to form a sub-assembly, thereby improving a mountability thereof. Furthermore, because the initial load of the torsion spring 16 may be set by adjusting only the brackets 14 and 15, influences of deformations and backlash of the link mechanism (11 through 13) caused by the load may be prevented.

In the first embodiment, the torsion spring 16 may not be provided so as to be coaxial with the output shaft 19. The first bracket 14 may be formed integrally with the driving arm 12, and the second bracket 15 may be formed integrally with the output shaft 19. In the first embodiment, the fins 8 are actuated by the motor 10 and the driving speed reducing gear train, however, the fins 8 may be actuated by an electromagnetic solenoid or a fluid pressure piston. The deceleration mechanism or a thrust force transforming mechanism connected to the motor 10 may not be the driving speed reducing gear train or the link mechanism (11 through 13) and may be a pulley, a screw mechanism or a cam mechanism.

Figure 3:
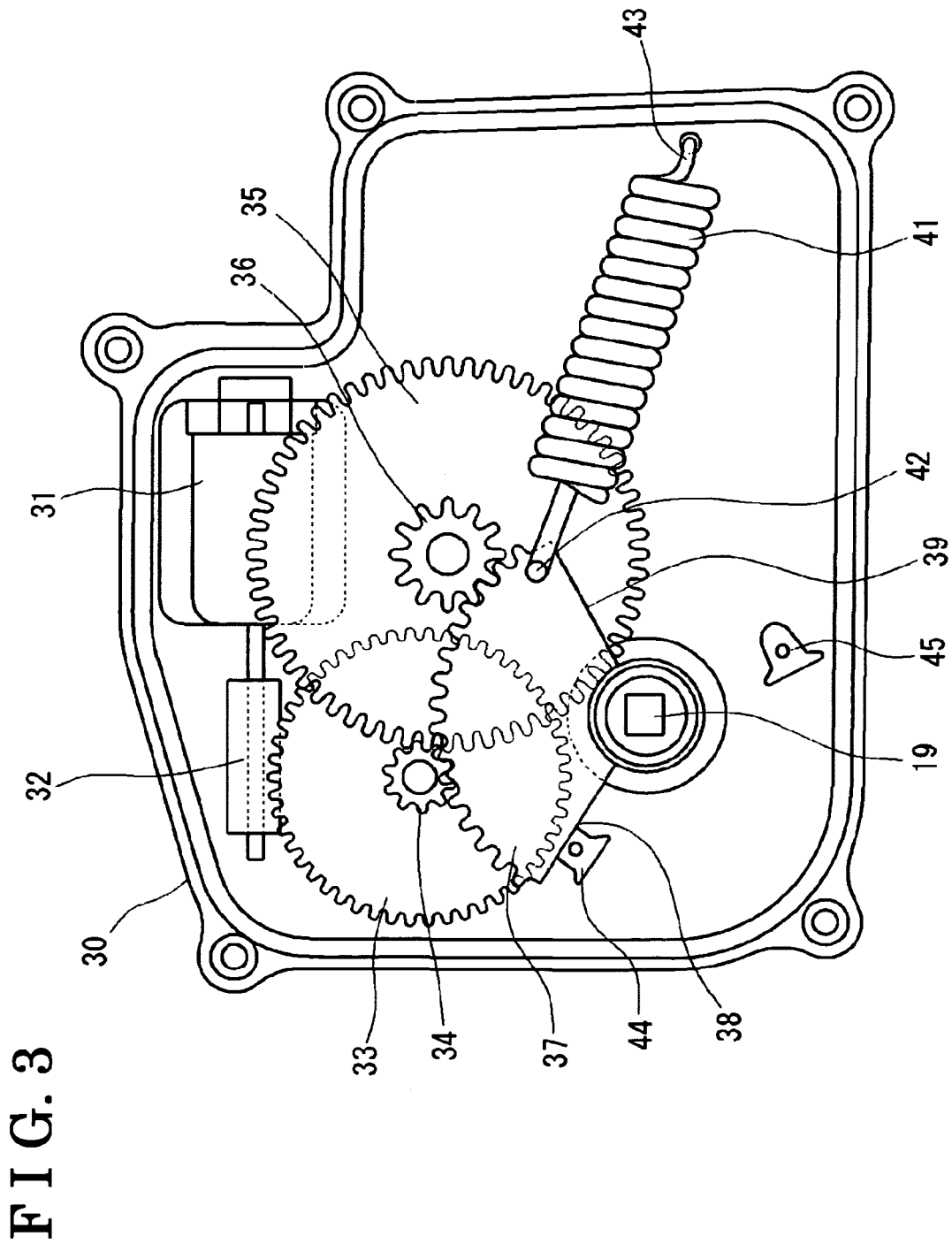
FIG. 3 indicates a side view of a housing of the grille shutter related to a second embodiment of this disclosure, the housing containing therein a motor and a driving speed reducing gear train.

A second embodiment of this disclosure will be explained. Because a grille shutter of the second embodiment has a configuration that is basically similar to that of the first embodiment, same numerals are used for explaining identical components and mechanisms. FIG. 3 is a side view of a housing 30 in which a motor 31 (e.g., a drive source), a worm gear 32, a worm wheel 33 (e.g., a gear), a first pinion 34 (e.g., the gear), a gear 35 (e.g., the gear), a second pinion 36 (e.g., the gear) and a sector gear 37 (e.g., the gear) are housed. The worm gear 32, the worm wheel 33, the first pinion 34, the gear 35, the second pinion 36 and the sector gear 37 serve as the driving speed reducing gear train (driving force transmitting mechanism). The worm gear 32 is provided at the output shaft of the motor 31 and is meshing with the worm wheel 33. Because an advancing angle of the worm gear 32 is set so as to be larger than a friction angle, the worm gear 32 is rotatable by the worm wheel 33. The worm wheel 33 and the first pinion 34 are coaxially and integrally formed, and the first pinion 34 is meshing with the gear 35. The gear 35 and the second pinion 36 are coaxially and integrally formed, and the second pinion 36 is meshing with the sector gear 37 that is rotatable relative to the output shaft 19. In this configuration, the motor 31, the worm gear 32, the worm wheel 33, the first pinion 34, the gear 35, the second pinion 36 and the sector gear 37 are housed in the housing 30. A first spring holder 42 is engaged with the sector gear 37, and the a second spring holder 43 is engaged with the housing 30. The first spring holder 42 and the second spring holder 43 are coaxially arranged, and a relative position therebetween is changeable. A turnover spring 41 (e.g., a flexible member) is held while being compressed between the first spring holder 42 and the second spring holder 43. A first end portion 38 of the sector gear 37 is adapted to contact a first stopper 44 (e.g., a contacting member) provided upon the housing 30, and similarly, a second end portion 39 of the sector gear 37 is adapted to contact a second stopper 45 (e.g., the contacting member). The output shaft 19 is connected to the driving arm 12, and a configuration of components provided between the interlocking arm 11 and the fins 8, including the interlocking arm 11 and the fins 8, is similar to those of the first embodiment.

In a case where the fins 8 are in fully closed states, a reaction force of the turnover spring 41 is transmitted to the sector gear 37 via the first spring holder 42, and the first end portion 38 of the sector gear 37 contacts the first stopper 44 by being pressed in a direction where the fins 8 are closed. Similarly, in a case where the fins 8 are in fully opened states, the reaction force of the turnover spring 41 is transmitted to the sector gear 37 via the first spring holder 42, and the second end portion 39 of the sector gear 37 contacts the second stopper 45 by being pressed in a direction where the fins 8 are opened.

The rotational force of the motor 31 is transmitted to the sector gear 37 via the worm gear 32, the worm wheel 33, the first pinion 34, the gear 35 and the second pinion 36. In a case where the fin 8 being in the closed state is actuated to be the opened state, the sector gear 37 is rotated by the rotational force of the motor 31 against the pressing force generated by the turnover spring 41. The sector gear 37 stops its rotation after passing a range in which a level of a reaction caused by the elasticity of the turnover spring 41 becomes maximum, and then the second end portion 39 engages the second stopper 45. In a case where the fin 8 being in the opened state is actuated to be in the closed state, the abovementioned process goes in a reversed manner.

When an excessive load caused by water pressure or the like acts on the fins 8 being in the closed state, the excessive load acting on the fins 8 is transmitted to the sector gear 37 via the arm and the like and acts on the sector gear 37 so as to generate a torque. In a case where a level of the torque generated by the excessive load is greater than a level of a maintaining torque generated by the pressing force of the turnover spring 41, the sector gear 37 is rotated from the side of the output shaft 19. Because the advancing angle of the worm gear 32 is set so as to be larger than a friction angle, the worm gear 32 does not function as a reverse movement preventing mechanism. In a case where the level of the torque caused by the excessive load is greater than a level of a maintaining torque generated by a pressing force caused by a reaction of the elasticity of the turnover spring 41 being compressed so as to generate a maximum reaction force thereof, the sector gear 37 is rotated until it reaches the opened state. On the other hand, in a case where the level of the torque caused by the excessive load is smaller than the level of the maintaining torque generated by the pressing force caused by a reaction of the elasticity of the turnover spring 41 being compressed so as to generate the maximum reaction force thereof, the sector gear 37 is returned in the middle of the operation so as to be in the closed state.

According to the grille shutter 5 of the embodiment, because the housing 30 houses the motor 31, the worm gear 32, the worm wheel 33, the first pinion 34, the gear 35, the second pinion 36, the sector gear 37 and the turnover spring 41, those components may not be affected by physical effects such as powder dust and a stepping stone or natural effects such as a rust and a degradation. Further, because the housing 30 and those components (the motor 31, the worm gear 32, the worm wheel 33, the first pinion 34, the gear 35, the second pinion 36, the sector gear 37 and the turnover spring 41) may be sub-assembled, a level of mountability may be increased.

Further, because the turnover spring 41 presses the sector gear 37, vibrations caused on rough road or wind pressure may be prevented so that a noise level may be reduced, and furthermore the worm gear 32, the worm wheel 33, the first pinion 34, the gear 35, the second pinion 36, the sector gear 37 and the bearing of the link mechanism may not wear out. Because the level of pressure of the turnover spring 41 may be set by less components, influences of deformations and backlash of the worm gear 32, the worm wheel 33, the first pinion 34, the gear 35, the second pinion 36, the sector gear 37 and the link mechanisms may not be considered, accordingly the level of the pressing force of the turnover spring 41 may be easily set. Furthermore, because the stoppers 44 and 45 are provided independently from the drive force transmitting path, even in the case where the worm gear 32 is used, a level of transmission efficiency of the driving force may be increased, while the reverse movement preventing mechanism is not provided.

A third embodiment of this disclosure will be explained.

Figure 4:
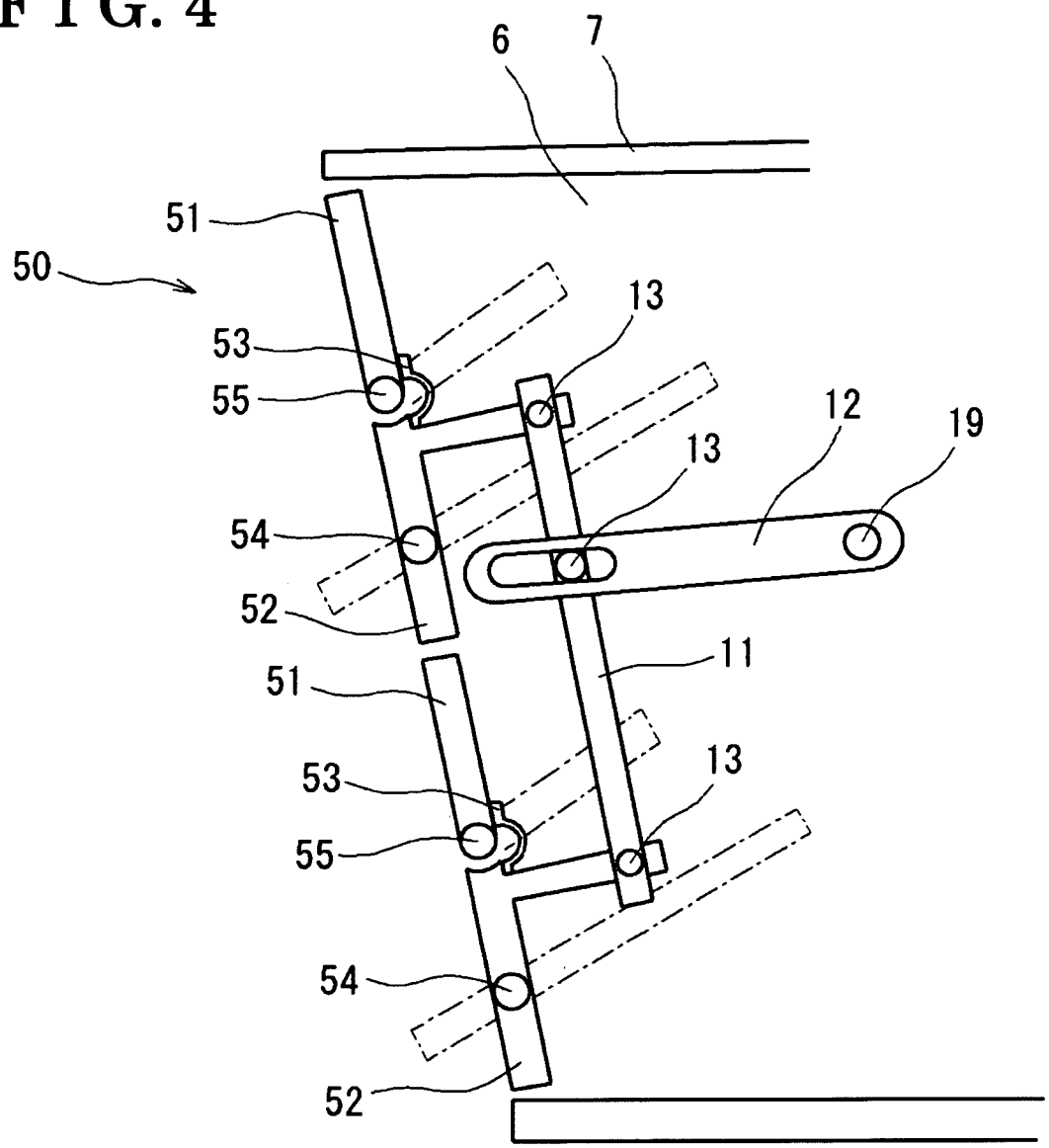
FIG. 4 is a side view of a fin and an attachment portion of the grille shutter related to a third embodiment of this disclosure.

Because a grille shutter of the third embodiment has a configuration that is basically similar to that of the first embodiment and the second embodiment, the same numerals are used for explaining identical components and mechanisms. FIG. 4 is a side view of fins 51 and an attachment portion of the grille shutter 50 according to the third embodiment. Base fins 52 (driving force transmitting members) are attached to the base frame 7 provided at the grille opening portion 6 so as to be freely rotatably relative to first supporting shafts 54, respectively. The fins 51 are provided so as to be freely rotatably relative to second supporting shafts 55, respectively, and a torsion spring 53 (e.g., a flexible member) is provided to each of the fins 51 and each of the base fins 52. One end of each of the torsion springs 53 is fixed to the fin 51, and the other end of the each of the torsion springs 53 is fixed to the base fin 52. Each of the fins 51 is biased by the torsion spring 53 so as to close the grille opening portion 6. The base fins 52 are connected to each other by the interlocking arm 11 by means of the pins 13, and the interlocking arm 11 is connected to the driving arm 12 by means of the pin 13, thereby configuring a link mechanism. The driving arm 12 is directly connected to an output shaft 19. A configuration from the output shaft 19 to a motor is identical to that of the first embodiment.

In a case where a normal level of the wind pressure acts on the fins 8, the torsion springs 53 are not deformed so as to open the fins 51 and are used to transmit the driving force generated at the motor in order to operate the fins 51 and the base fins 52 to open the grille opening portion 6, while keeping a relative position between the fins 51 and the base fins 52. In a case where the fins and the base fins 52 are positioned so as to close the grille opening portion 6, and when a vehicle is driven through a puddle on a road surface, because an overload caused by water pressure acts on the fins 51, the overload acting on the fins 51 is transmitted to the torsion springs 53, accordingly the torsion spring 53 is deformed in a direction in which the fins 51 are operated to open the grille opening portion 6, thereby opening the fins 51 without actuating the motor.

According to the grille shutter 50 of the third embodiment, because the torsion springs 53 serving as a flexible member are provided in the vicinity of the fins 51, respectively, and not provided at any portion on the drive force transmitting path, the structure of the drive force transmitting path may be simplified. Further, because the configuration of the drive force transmitting path is simplified, components used for the drive force transmitting path may be commonly used with different types of vehicles. Furthermore, because inertia of components other than the fins 51 may not affect the torsion springs 53, a level of responsive of the torsion springs 53 against the overload may be increased.

According to the embodiment of this disclosure, a movable grille shutter 5 for a vehicle includes fins 8 adapted to be provided at a grille opening portion 6 and being operated so as to freely open or close the grille opening portion 6 through which ambient air is taken in, the motor 10, for driving the fins 8, the gears (32, 33, 34, 35, 36, 37) and the link mechanism (11, 12, 13) for transmitting a driving force from the motor 10 to the fins 8 and a torsion spring 16 being linked to the gears (32, 33, 34, 35, 36, 37) and the link mechanism (11, 12, 13) and being deformed for operating the fin 8 to open the grille opening portion 6 in a case where a load that is equal to or more than a predetermined value is acted thereon. Further, the torsion spring 16 is arranged between the gears (32, 33, 34, 35, 36, 37) and the link mechanism (11, 12, 13) and is pressed therebetween.

Thus, in a case where a load whose level is greater than a normal level of the wind pressure acts on the fin, for example in a case where a vehicle is driven through a puddle on a road surface, and an overload caused by water pressure or the like acts on the fins 8, the overload deforms the torsion spring 16, thereby operating the fins 8 so as to open the grille opening portion 6, where the overload caused by water pressure or the like is avoided. Accordingly, the fins 8, the link mechanism (11 through 13), the gears (32, 33, 34, 35, 36, 37) and the like are protected from the overload, thereby preventing them from being damaged. The initial load of the torsion spring 16 may be freely set to any level so that the fins 8 are not actuated so as to be opened by the wind pressure caused when the vehicle is driven at the normal speed. Further, the torsion spring 16 and the brackets 14 and 15 are put together to form a sub-assembly, thereby improving a mountability thereof. Furthermore, because the initial load of the torsion spring 16 may be set by adjusting only the brackets 14 and 15, influences of deformations and backlash of the link mechanism (11 through 13) caused by the load may be prevented.

According to the embodiment of this disclosure, the movable grille shutter 5 further includes a housing 30 that houses all or a part of the gears (32, 33, 34, 35, 36, 37) and the turnover spring 41, and one end of the turnover spring 41 is engaged with the sector gear 37, and the other end of the turnover spring 41 is engaged with the housing 30. Furthermore, the housing 30 includes the stoppers 44 and 45 to which the sector gear 37 contacts in a case where the fins 8 are in the fully closed state or the fully opened state, and the turnover spring 41 establishes a range between the fully closed state and the fully opened state, in which a level a reaction force caused by elasticity of the turnover spring 41 becomes maximum.

Thus, because the housing 30 houses the motor 31, the worm gear 32, the worm wheel 33, the first pinion 34, the gear 35, the second pinion 36, the sector gear 37 and the turnover spring 41, those components may not be affected by physical effects such as powder dust and a stepping stone or natural effects such as a rust and a degradation. Further, because the housing 30 and those components (the motor 31, the worm gear 32, the worm wheel 33, the first pinion 34, the gear 35, the second pinion 36, the sector gear 37 and the turnover spring 41) may be sub-assembled, a level of mountability may be increased.

Further, because the turnover spring 41 presses the sector gear 37, vibrations caused on rough road or wind pressure may be prevented so that a noise level may be reduced, and furthermore the worm gear 32, the worm wheel 33, the first pinion 34, the gear 35, the second pinion 36, the sector gear 37 and the bearing of the link mechanism may not wear out. Because the level of pressure of the turnover spring 41 may be set by less components, influences of deformations and backlash of the worm gear 32, the worm wheel 33, the first pinion 34, the gear 35, the second pinion 36, the sector gear 37 and the link mechanisms may not be considered, accordingly the level of the pressing force of the turnover spring 41 may be easily set. Furthermore, because the stoppers 44 and 45 are provided independently from the drive force transmitting path, even in the case where the worm gear 32 is used, a level of transmission efficiency of the driving force may be increased, while the reverse movement preventing mechanism is not provided.

According to the embodiment of this disclosure, the driving force transmitting mechanism includes the gears (32, 33, 34, 35, 36, 37), the link mechanism (11, 12, 13) and the base fin 52, wherein the fin 51 is engaged with the base fin 52, and the torsion spring 53 biases the fin 51 in a direction where the fin 51 rotates relative to the base fin 52, and the torsion spring 53 is provided between the fin 51 and the base fin 52.

Thus, because the torsion springs 53 serving as a flexible member are provided in the vicinity of the fins 51, respectively, and not provided at any portion on the drive force transmitting path, the structure of the drive force transmitting path may be simplified. Further, because the configuration of the drive force transmitting path is simplified, components used for the drive force transmitting path may be commonly used with different types of vehicles. Furthermore, because inertia of components other than the fins 51 may not affect the torsion springs 53, a level of responsive of the torsion springs 53 against the overload may be increased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A movable grille shutter for a vehicle comprising:
   a fin adapted to be provided at a grille opening portion and being operated so as to freely open or close the grille opening portion through which ambient air is taken in;
   a drive source for driving the fin;
   a driving force transmitting mechanism for transmitting a driving force from the drive source to the fin; and
   a flexible member being in association with the driving force transmitting mechanism and being deformed for causing the fin to open the grille opening portion upon receipt of a load that is equal to or more than a predetermined value is acted thereon;
   wherein the driving force transmitting mechanism includes a driving speed reducing gear train; and
   wherein the flexible member is arranged between the driving speed reducing gear train and the fin.

2. The movable grille shutter for the vehicle according to claim 1, wherein the driving force transmitting mechanism includes a gear and a link mechanism, and the flexible member is arranged between the gear and the link mechanism and is pressed therebetween.

3. The movable grille shutter for the vehicle according to claim 1 further including a housing, wherein the driving force transmitting mechanism includes at least one of gears and a link mechanism, and the housing houses all or a part of the gears and the flexible member, and one end of the flexible member is engaged with the gear, and the other end of the flexible member is engaged with the housing.

4. The movable grille shutter for the vehicle according to claim 1, wherein the driving force transmitting mechanism includes a gear, a link mechanism and a base fin, wherein the fin is engaged with the base fin, and the flexible member biases the fin in a direction where the fin rotates relative to the base fin, and the flexible member is provided between the fin and the base fin.

5. The movable grill shutter for the vehicle according to claim 1, wherein the flexible member is connected to the driving speed reducing gear train and presses the driving speed reducing gear train.

6. The movable grill shutter for the vehicle according to claim 1, wherein the driving speed reducing gear train comprises a worm gear, a worm wheel, a first pinion, a second pinion, and a sector gear.

7. The movable grille shutter for the vehicle according to claim 2, wherein the flexible member includes a torsion spring.

8. The movable grille shutter for the vehicle according to claim 3, wherein the housing includes a contacting member to which the gear contacts in a case where the fin is in at least one of a fully closed state and a fully opened state, and the flexible member is a turnover spring that establishes a range between the fully closed state and the fully opened state, in which a level a reaction force caused by elasticity of the turnover spring becomes maximum.

* * * * *